M. B. BARKLEY.
COUPON BANK DEPOSIT BOOK.
APPLICATION FILED OCT. 16, 1914.
1,202,646.
Patented Oct. 24, 1916.
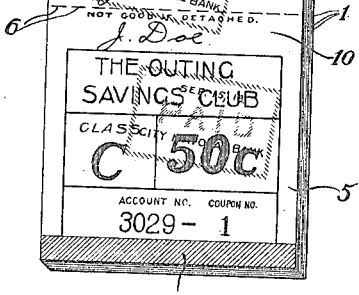
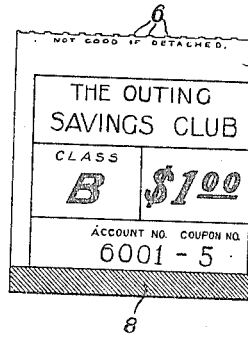
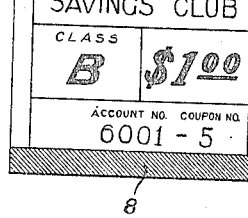

UNITED STATES PATENT OFFICE.

MERRILL B. BARKLEY, OF HOLYOKE, MASSACHUSETTS, ASSIGNOR, BY MESNE ASSIGNMENTS, TO THE BANKERS SERVICE CORPORATION, OF NEW YORK, N. Y., A CORPORATION OF NEW YORK.

COUPON BANK-DEPOSIT BOOK.

1,202,646.  Specification of Letters Patent.  Patented Oct. 24, 1916.

Application filed October 16, 1914. Serial No. 866,914.

*To all whom it may concern:*

Be it known that I, MERRILL B. BARKLEY, a citizen of the United States of America, and a resident of Holyoke, county of Hampden, State of Massachusetts, have invented certain new and useful Improvements in Coupon Bank-Deposit Books, of which the following is a specification.

This invention relates to that class of time-saving devices which are used to expedite and simplify the effecting of each of a series of separate but related transactions, or definite parts of a transaction, and the keeping of a record thereof, and more particularly to methods and systems for handling special or so-called "club" accounts in banks, and to customers' deposit books for use in connection with such systems.

There has developed recently in banking circles a wide demand for various kinds of special savings accounts, known generally as Christmas clubs, vacation accounts, outing savings clubs, and the like, under which each depositor enters into an agreement with the bank whereby specified amounts are due to be deposited at definite times, the bank in its turn at the expiration of the aggregate period, say at Christmas time, paying back a certain amount, usually the principal wholly or in part as may be agreed upon, with interest; the object of such a system being mainly to encourage thrift and regularity on the part of new and prospective patrons in developing the savings habit.

Although this invention is especially applicable to savings accounts of the character stated, it is not limited thereto but may be used to advantage for various other purposes wherein a serial or multipartite transaction is involved, notably in connection with installment purchases, and the payment of rents, current service charges of a predeterminable character, and the like. Such a system, in order to be convenient, efficient and practical requires special means to facilitate accounting and to keep the party carrying the current obligation informed as to the condition of his account and when payments are due.

The main objects of this invention are to provide an improved system for use in connection with the making of a series of payments or deposits on account from time to time as may be agreed upon; to provide an improved form of receipt book having provision for indicating the amounts payable by the holder at certain times and having provision for the recording of receipts therein; to provide such a book having coupons adapted when removed to serve as a record for the payee; to provide an improved form of bank deposit book having means whereby the depositor or a bank clerk, upon inspecting the same, may see at a glance what payments have been made and what payments are coming due, with the dates thereof; to provide in such book a table including pay dates and amounts due, and showing certain group aggregates indicating the totals payable in certain longer periods; and to provide a coupon book of a character specified which, with a deposit, may be mailed under a two-cent stamp.

An illustrative embodiment of this invention is shown in the accompanying drawings, in which—

Figure 1 is a perspective view of a coupon book opened to show the first coupon page and the inner side of the front cover having a table thereon. Fig. 2 is a perspective view similar to Fig. 1 but with two of the coupons removed and the third sheet ready for stamping and validating. Fig. 3 shows a coupon from another book representing a different class or denomination but otherwise similar.

Referring to the drawings, the form of book shown for illustrating this invention is a "saving's club" account and comprises a plurality of sheets or leaves 1 bound together at 2 on one edge and a cover 3 on the front also secured at 2. Each of the sheets 1 comprises a stub portion 4 and a detachable coupon 5 and each sheet has a weakened line of demarkation as at 6 along the adjoining edges of said portions whereby the coupon may be readily removed. Preferably the sheets are alike, with the exception that the stubs and coupons are serially numbered, each coupon being numbered the same as the stub to which it is attached, the serial numbers in the present instance running from 1 to 10 as shown by the table 7 on the cover 3. Preferably each stub and coupon bears an account number, such as customarily is used on bank books, corresponding with the account of the person holding the book, for example "Account No. 3029."

Each sheet is provided with class designating means preferably represented by a letter, as "Class C" on the coupon, which designation preferably appears also on the stub. The class or denomination also may be and preferably is further expressed or visualized by a characteristic color, which may be imparted to the leaf as a whole or to a certain part as, for instance, a broad line or band across the outer end of the coupon, as shown at 8. In case a band of color is used the printing may to advantage also be done in the same color. The obligation, value or amount represented by each leaf, for example "$1.00," appears both on the stub and coupon. This amount may be and usually is the same on all of the sheets, but may be arranged either in an ascending or descending scale on successive sheets depending upon the form or system desired in any particular case.

The stubs are each adapted for receipting and for this purpose to receive a validating sign or mark, usually consisting of the name or initials of a bank clerk, for instance "J. Doe." The coupon may also be marked in like manner if desired for greater completeness of the bank record. Whenever a payment is made a stamp is impressed on the stub, and preferably also upon the coupon, which stamp includes the word "Paid" or words of like import, together with the name of the payee, as "City National Bank," and the date of actual payment. A definite space 9 preferably is provided on the stub to receive the validating signature. A space 10 for like purpose may also be provided to advantage on the coupon to facilitate making the coupon record complete and to identify the clerk who received the payment. Whenever a payment is made the coupon is removed by the payee or bank clerk and retained as a deposit slip, or if preferred may be used to supplement an ordinary deposit slip. In any case the coupon serves as a quick and ready means for recording the specific payment so far as the bank is concerned, while the validated stub serves as a receipt in the hands of the depositor.

The table 7 on the cover shows the dates when payments are due and the amounts payable on such dates respectively. For this purpose the table is arranged in columns having, for instance, the following headings: "Coupon No.," "Date," "Weekly" and "Monthly."

The date column contains the days of the month corresponding with those days of the week on which payments are due. The weekly column shows the amounts due each week, and the monthly column shows the aggregate sum due for each particular month. The table indicates the current year, and also states the date when the club term closes. The total deposit agreed upon is also shown in connection with the table. The amounts shown in the weekly column whether all alike or in a progressive series correspond with the amounts on the stubs and coupons represented by the numbers respectively in the coupon number column. It will be understood that while the table is not an indispensable adjunct to the stubs and coupons, it adds greatly to the convenience and value of the system as a whole, and should be included. The monthly column is useful in case it may be desired at any time to make payments monthly in advance.

One of the main advantages of the system covered by this invention as used by banks is its facility for handling a large number of customers in a short time, as is necessary in rush hours, the coupons serving as a temporary record, which coupons may be collected hurriedly in a large quantity and subsequently sorted and the amounts posted to the proper accounts. A further advantage is derived by the use of the table in that it enables the holder to determine readily for himself at any time the exact condition of his account and thus prevent inadvertent neglect of payments as they become due. An advantage derived from having the stubs and coupons receipted in longhand is that likelihood of fraud is overcome. The coupons may be turned over to an accountant for posting as soon as received and by balancing accounts daily a check may be kept on cash received, which is important, for experience has shown that failure to prove such accounts daily soon results in the club accounts being thrown out of balance.

The outer side of the cover is preferably colored to correspond with the class of the account.

The books may be, and in most cases preferably are, made of such size and weight as to be mailable under two-cent postage, together with the current deposit due, whereby in some instances inconvenience and loss of time are avoided on the part of the depositor.

Although but one specific embodiment of this invention has been herein shown and described, it will be understood that numerous details of the form and arrangement shown may be altered or omitted without departing from the spirit of this invention as defined by the following claims.

I claim—

1. A deposit book, adapted to indicate the amounts paid and to be paid by a depositor or a bank's customer, comprising a plurality of sheets, each sheet consisting of a stub and a detachable coupon, the stubs and those coupons which remain attached to be held by the depositor until the account is closed, the stubs and coupons throughout the book bearing a common designating mark and being likewise serially numbered, and each stub having a space for the reception of a validating signature.

2. A deposit book adapted to indicate the amounts paid and to be paid by a depositor or a bank's customer, comprising a plurality of sheets, each sheet consisting of a stub and a detachable coupon, the stub and those coupons which remain attached to be held by the depositor until the account is closed, the stub and coupons throughout the book bearing an imprint indicating a specific money value, each stub and coupon throughout the book likewise bearing a common designating mark and being serially numbered, and each stub having a space left thereon for the reception of a validating signature, said signature being applied to each stub by a bank official as the corresponding coupon is detached and retained by said official as a bank record.

3. A deposit book adapted to indicate the amounts paid and to be paid by a depositor or a bank's customer, comprising a plurality of sheets, each sheet consisting of a stub and a detachable coupon, each stub and coupon bearing an imprint indicating a specific money-value, the stubs and coupons throughout the book bearing a common designating mark and likewise being serially numbered, and the stubs having a space left thereon for the reception of a validating signature adapted to be applied by a bank official when the corresponding coupon is detached; and a table bearing serial numbers corresponding to the serial numbers aforesaid and the amount of the money-value upon the serially-numbered sheets, said numbers and money-value designations being grouped into time periods, with the total money-value for each group separately expressed, the book containing the validated stubs and those coupons which remain attached to be held by the depositor until the full amount called for by the book has been deposited, or the account closed.

4. A deposit book for assisting in the carrying out of a multi-partite business transaction, including obligations of serial, periodic character, comprising in combination a plurality of sheets each including a stub and a coupon, each of said stubs and coupons having an imprint indicating, in any desired terms, a specific part of an obligation to be carried out or performed at a given time, and each also having like designating means.

5. A deposit book, adapted to indicate the amounts paid and to be paid by a depositor or a bank's customer, comprising a plurality of sheets and detachable coupons, each coupon and corresponding sheet portion having corresponding imprints to indicate the specific act of payment to be made in connection therewith, the coupons being arranged in arithmetical series and bearing a common designating mark.

6. A deposit book, adapted to indicate the amounts paid by a depositor or a bank's customer, comprising a plurality of sheets and detachable coupons, the sheets and those coupons which remain attached to be held by the depositor until the account is closed, each of said coupons having an imprint indicating in any desired terms a specific part of an obligation to be carried out or performed at a given time, and each coupon as well as that part of the book retained by the depositor having like designating means.

7. A deposit book, adapted to indicate the amounts paid and to be paid by a depositor or a bank's customer, comprising a plurality of sheets, each sheet consisting of a stub and a detachable coupon, the stubs and those coupons which remain attached to be held by the depositor until the account is closed, the stubs and coupons throughout the book bearing a common designating mark and being likewise serially numbered, and each stub having a space for the reception of a validating mark.

8. A deposit book, adapted to indicate the amounts paid and to be paid by a depositor or a bank's customer, comprising a plurality of sheets, each sheet consisting of a stub and a detachable coupon, the stub and those coupons which remain attached to be held by the depositor until the account is closed, the stubs and coupons throughout the book bearing an imprint indicating a specific money value, each stub and coupon throughout the book likewise bearing a common designating mark and being serially numbered, and each stub having a space left thereon for the reception of a validating mark, said mark being applied to each stub by a bank official as the corresponding coupon is detached and retained by said official as a bank record.

Signed at Holyoke this 9th day of October, 1914.

MERRILL B. BARKLEY.

Witnesses:
ANNIE C. ROONEY,
CECILIA A. FREEMAN.